Aug. 4, 1970  H. T. JONES  3,523,238

CURRENT SENSING DEVICE

Filed March 8, 1968

Inventor,
Howard T. Jones,
by Sidney Greenberg
His Attorney.

United States Patent Office 3,523,238
Patented Aug. 4, 1970

3,523,238
CURRENT SENSING DEVICE
Howard T. Jones, Flat Rock, N.C., assignor to General
Electric Company, a corporation of New York
Filed Mar. 8, 1968, Ser. No. 711,539
Int. Cl. G01r *19/16*
U.S. Cl. 323—6      7 Claims

ABSTRACT OF THE DISCLOSURE

Variable output constant current regulator for operating airport runway lights is equipped with a current sensing device in series-circuit with the load for converting the current to a voltage signal proportional to the current for transmittal to a detector in a data processing system, the sensing device including a current transformer having a primary in series with the load in the lighting circuit, the secondary of the transformer having an inductor and a capacitor in series therewith, and a pair of conducting leads connecting the detector across the capacitor for detecting the voltage drop therein.

---

Figure 1:
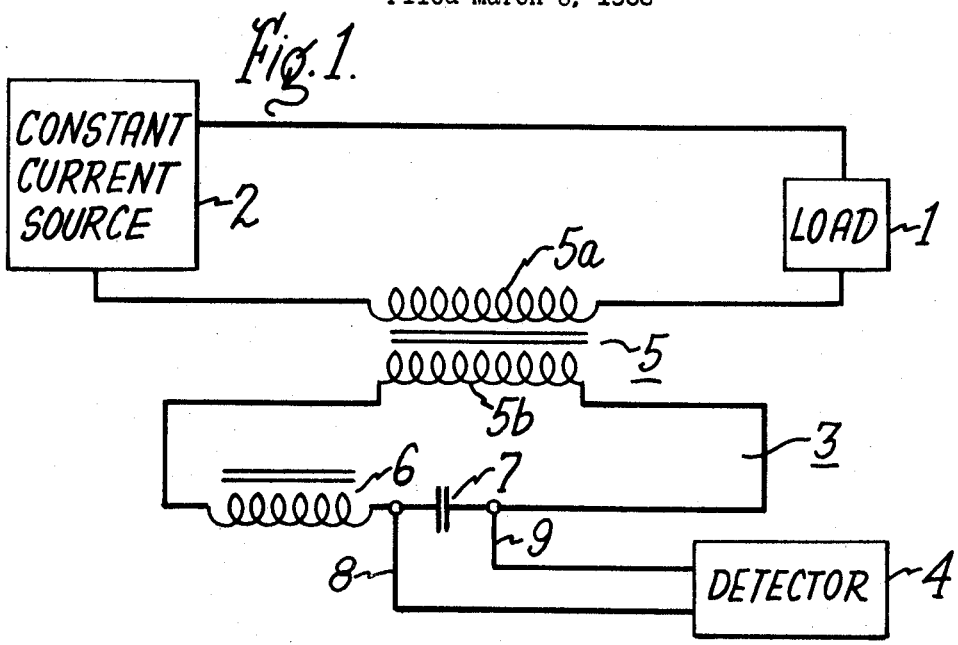

The present invention relates to constant current regulators, and more particularly to such regulators used in lighting circuits for supplying selected levels of current to lamps for controlling their brightness.

Lighting circuits of the above type to which the invention is particularly adapted are those used for lighting airport runways and in which the lamp brightness is controlled in accordance with visibility conditions at the airport. In conjunction with such airport lighting systems the Federal Aviation Agency has provided for the use of a data converting system including a computer by which information such as the brightness of the lamps and the visibility conditions at the airport runway is processed to determine the proper adjustment of the lamp brightness under the prevailing conditions. Such data processing equipment is provided in FAA Specification FAA-E-2267 entitled Runway Visual Range Signal Data Converter System (hereinafter called RVR system), and in order to provide the proper input to the RVR system it is necessary to sense the current in the lighting load circuit, convert the current to a proportional voltage and transmit such voltage signals to the detector forming a part of the RVR system.

It is, accordingly, an object of the invention to provide a current regulator having a current sensing device for sensing the current output of the regulator, converting the current to a proportional voltage and transmitting the voltage to a voltage sensitive detecting device, and especially to a detector forming part of the above-described RVR system.

It is another object of the invention to provide an apparatus of the above type for use with variable output constant current regulator devices, especially those specified for use in airport runway lighting systems.

Still another object of the invention is to provide a current sensing device of the above type which provides a voltage output of proper linearity and range applicable for use with the described RVR system.

Other objects and advantages will become apparent from the following description and the appended claims.

With the above objects in view, the present invention in one of its aspects relates to the combination in a variable output constant current regulator having a load circuit, of a device for sensing the current in the load circuit and converting the current to a voltage signal proportional to the current for transmittal to a voltage sensitive device, comprising a current transformer having a primary in series with the load in the load circuit, a series load connected to the secondary of said current transformer comprising an inductor and a capacitor connected in series, and conductor means connected across said capacitor and adapted to be connected to the voltage sensitive device for transmitting the voltage drop across the capacitor to the voltage sensitive device.

Figure 2:
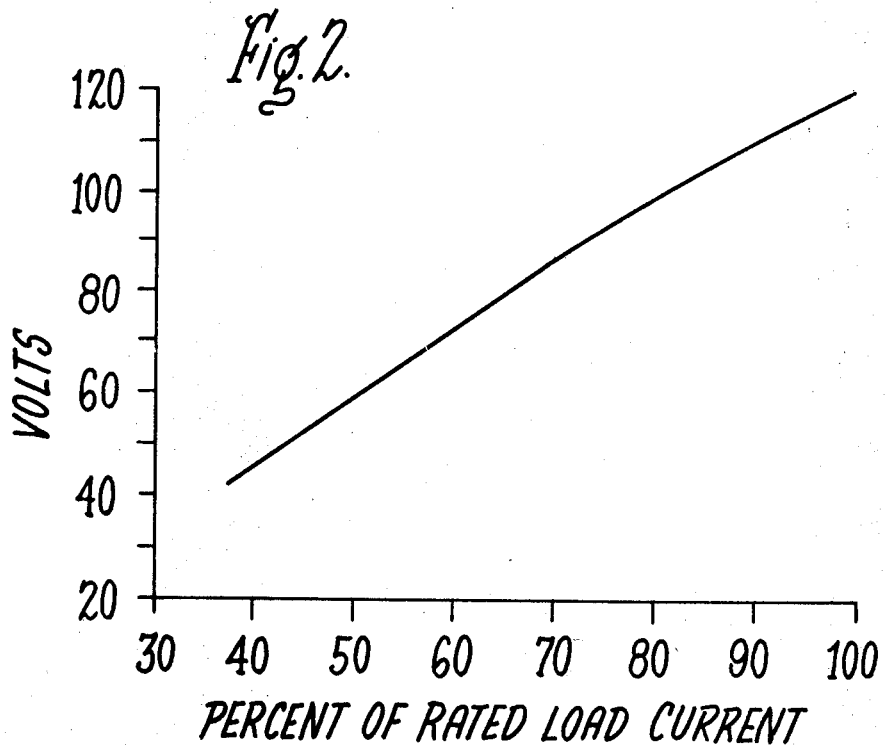

The invention will be better understood from the following description taken in conjunction with the accompanying drawing, in which:

FIG. 1 is a circuit diagram of a constant current regulator arrangement embodying a current sensing and converting device in accordance with the invention; and FIG. 2 is a graph showing the characteristics of the output of the current sensing and converting device of the invention.

Referring now to the drawing, and particularly to FIG. 1, there is shown a circuit arrangement for energizing at a constant current a load 1, such as an illuminating means. The illuminating means may be constituted by one or more lamps in series, such as incandescent, gaseous discharge or fluorescent-type lamps. Load 1 is connected as shown to a constant current source 2 which may be constituted by a movable coil constant current transformer with associated control device and connected to an alternating current supply as disclosed, for example, in co-pending application of Jones et al., Ser. No. 674,079, filed Sept. 26, 1967, now Pat. 3,440,520 issued Apr. 22, 1969, and assigned to the same assignee as the present invention. As described in the co-pending application, the disclosure of which is incorporated herein by reference, load 1 is connected to the secondary winding of the movable coil transformer, which, as understood in the art, is a variable impedance device that provides a constant output current to a range of load impedances throughout a limited variation in the primary supply voltage, and it corrects any variations in output current by changing the variable impedance in series with the load. In the regulator circuit shown in the co-pending application, a control device is incorporated for varying in stepless fashion the level of the constant output current which would otherwise be fixed, and the control device is manually adjustable by means of a variable resistance for changing the current to the load, and thus changing the level of brightness of the lamps constituting the load.

In accordance with the present invention, a load monitoring circuit 3 is provided for sensing the current output of the regulator of constant current source 2 and converting the current to a proportional voltage suitable as an input to a high impedance detector circuit 4 which in turn controls data input to a computer or other data processing apparatus (not shown) employed for determining and indicating the proper level of current to load 1. The operator of the lighting system, upon receiving such indication from the data processing apparatus, will manually adjust the current regulator to obtain the proper brightness of the lamps. As explained above, such a detector circuit and associated data processing apparatus (RVR) is provided for by FAA specifications in connection with determining proper light levels of airport runway lights, and it will be understood that the particular detector circuit, data processing or other apparatus to which the output of current sensing and converting device 3 as applied forms no part of the present invention.

Load monitoring circuit 3 comprises a current transformer 5 having its primary winding 5a connected in series in the load circuit as shown. Arranged in series with secondary winding 5b is an inductor 6 and capacitor 7 in series therewith. Connected across capacitor 7 are conducting leads 8, 9 by which the output of monitoring circuit 3 is applied to detector 4 of the data processing system. Detector 4 is a voltage sensitive device and its characteristics, and those of the RVR data processing system, are such that it is necessary for the voltage output from sensing circuit 3 to extend over the range of about 40 to about 125 volts and that it have a linear response to the variations in current in the load circuit. Such requirements are based on standard airport lighting regulator circuits where the load current varies between 6.6 and 2.8 amperes, or between 20 and 8.5 amperes. The low voltage of the aforementioned voltage range corresponds with the low limit of each current range and the high voltage to the upper limit of each current range. The voltage drop across capacitor 7 is proportional to the current in the load circuit and with variation of the latter current in the above-mentioned standard ranges, the range of voltage applied to detector 4 connected across capacitor 7 will typically be at least about 50 volts and may vary, depending on the impedance of the detector circuit 4, from about 50 volts to about 80 volts to meet the requirements of government specifications. For example, with a detector impedance of 1 megohm or higher, the voltage signal will vary from about 120 volts at the upper current limit (6.6 or 20 amperes), to about 48 volts at the lower current limit (2.8 or 8.5 amperes). A reduction in this impedance to 200 kilo-ohms will reduce the voltage levels by about 3%, while an impedance of 50 kilo-ohms will reduce the voltage levels by about 12.5%.

FIG. 2 is a graphical illustration of an example of the foregoing voltage variations as afforded by the present invention, wherein the voltage output of current sensing circuit 3 across capacitor 7 is plotted against percent of rated load current in a circuit where the load current varies between 6.6 amperes (100%) and 2.8 amperes (42.5%). As indicated by the plotted line, voltage output at the lower current limit is about 49 volts, whereas at the upper current limit the voltage output is about 120 volts, thus ranging over 71 volts. The substantially linear characteristics of this voltage response is evident from the graph.

In contrast to this result, the voltage spread obtained across both inductor 6 and capacitor 7 in series in the same circuit was found to be about 23 volts, which would provide an insufficient variation in brightness increments for the described airport runway lighting purposes. In the case where detector 4 is connected across inductor 6 alone, the voltage response was markedly less linear than the response shown in the FIG. 2 graph and of a substantially smaller voltage range, making it less desirable for use with the described RVR system than the arrangement of the invention.

In a typical current sensing circuit of the invention for producing the desired results, current transformer 5 has 10 turns in the primary for use with the 6.6–2.8 ampere regulator and 3 turns for the 20–8.5 ampere regulator, while the secondary has about 500 turns for either case, inductor 6 has a value of 2.75 henries, measured at 1000 cycles or about 2,250 ohms impedance, and capacitor 7 is 1 microfared. It will be understood, however, that the particular values may vary from those stated by appropriate selection of the different components, provided that the volt-ampere parameters of the current sensing circuit are as described above in order to provide results which will conform to federal requirements pertaining to airport runway lighting systems.

It should be understood, nevertheless, that although the circuit arrangement of the invention has been described in connection with its use in an airport runway lighting system and particularly for operating the RVR data processing system as prescribed by FAA specifications, the invention is not intended to be limited to such use, and the volt-ampere parameters described above may be suitably varied to provide desired results in other applications of the invention. It may, for example, be employed in conjunction with lighting equipment other than that used for airports, or with other types of apparatus (e.g., electric ovens or other heating devices) which it is desired to operate at adjustable levels of constant current, and where control of such adjustment may be improved by use of a load current monitoring system such as herein disclosed.

It will also be understood that although the constant current source 2 as described above is constituted by the particular regulator and control arrangement disclosed in the aforementioned co-pending application, the invention is not limited to use with such a regulator, it being evident to those skilled in the art that other forms of constant current sources may be employed for operating the load as appropriate.

Accordingly, while the present invention has been described with reference to particular embodiments thereof, it will be understood that numerous modifications may be made by those skilled in the art without actually departing from the scope of the invention.

What I claim as new and desire to secure by Letters Patent of the United States is:

1. In a variable output constant current regulator having a load circuit, a device for sensing the current in the load circuit and converting the current to a voltage signal proportional to the current for transmittal to a voltage sensitive device, comprising a current transformer having a primary in series with the load in the load circuit, a series load connected to the secondary of said current transformer comprising an inductor and a capacitor connected in series, and conductor means connected across said capacitor and adapted to be connected to the voltage sensitive device for transmitting the voltage drop across the capacitor to the voltage sensitive device, the voltage drop across said capacitor being proportional to the current in the load circuit.

2. A device as defined in claim 1, wherein the current in the load circuit varies over a predetermined range and the output voltage of said sensing device transmitted by said conductor means is substantially linear in response to the variation of said load current.

3. A device as defined in claim 2, wherein said output voltage of said sensing device extends over a range of at least 50 volts in response to variation in the regulator load circuit current.

4. A device as defined in claim 3, wherein said output voltage varies over the range of about 40 volts to about 125 volts in response to a load current variation of from 2.8 to 6.6 amperes.

5. A device as defined in claim 3, wherein said output voltage varies over the range of about 40 volts to about 125 volts in response to a load current variation of from 8.5 to 20 amperes.

6. A device as defined in claim 1, wherein said load circuit includes a plurality of lamps arranged in series in said circuit.

7. A device for sensing the current in a load circuit and converting the current to a voltage signal proportional to the current for transmittal to a voltage sensitive device, comprising a current transformer having a primary adapted to be connected in series with the load in the load circuit, a series load connected to the secondary of said current transformer comprising an inductor and a capacitor connected in series, and conductor means connected across said capacitor and adapted to be connected to the voltage sensitive device for transmitting the voltage drop across the capacitor to the voltage sensitive device.

References Cited

UNITED STATES PATENTS

| | | | |
|---|---|---|---|
| 2,326,465 | 8/1943 | Keeler | 323—61 X |
| 3,061,828 | 10/1962 | Hauck | 340—251 |
| 3,176,214 | 3/1965 | Johnson | 323—60 X |

J. D. MILLER, Primary Examiner

A. D. PELLINEN, Assistant Examiner

U.S. Cl. X.R.

323—7; 324—127; 340—251